(12) United States Patent
Liu et al.

(10) Patent No.: US 9,759,579 B2
(45) Date of Patent: Sep. 12, 2017

(54) INDUCTIVE TOUCH-CONTROL DISPLAY SUBSTRATE, INDUCTIVE TOUCH-CONTROL SCREEN AND TOUCH-CONTROL DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Baoling Liu, Shanghai (CN); Qijun Yao, Shanghai (CN); Feng Lu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 516 days.

(21) Appl. No.: 14/300,171

(22) Filed: Jun. 9, 2014

(65) Prior Publication Data

US 2015/0185048 A1    Jul. 2, 2015

(30) Foreign Application Priority Data

Dec. 30, 2013   (CN) .......................... 2013 1 0747149

(51) Int. Cl.
*G01D 5/20* (2006.01)
*G02F 1/1333* (2006.01)
(Continued)

(52) U.S. Cl.
CPC ............. *G01D 5/20* (2013.01); *G01D 5/2006* (2013.01); *G02F 1/13338* (2013.01);
(Continued)

(58) Field of Classification Search
CPC . H01L 27/1274; H01L 51/0059; G01N 33/92; G01N 33/48728; G01D 5/20; G02F 1/13338; G06F 3/041
(Continued)

(56) References Cited

U.S. PATENT DOCUMENTS 9,201,355 B2 * 12/2015 Tanaka ............... G03G 15/2017
2008/0303774 A1 * 12/2008 Yoshinaga ............ G06F 3/0412
345/98

(Continued)

FOREIGN PATENT DOCUMENTS

| CN | 102541349 A | 7/2012 |
|---|---|---|
| CN | 102609128 A | 7/2012 |
| CN | 103092446 A | 4/2016 |

*Primary Examiner* — Melissa Koval
*Assistant Examiner* — Trung Nguyen
(74) *Attorney, Agent, or Firm* — Alston & Bird LLP

(57) ABSTRACT

The invention discloses an in-cell inductive touch-control display substrate, an inductive touch-control screen and a touch-control display device. The in-cell inductive touch-control display substrate includes: a first electrode layer; a second electrode layer insulated from the first electrode layer to form an electric field; first electromagnetic inductive coils extending in the row direction and forming loops and second electromagnetic inductive coils extending in the column direction and forming loops, disposed in the same layer as the first electrode layer. The first electromagnetic inductive coils or the second electromagnetic inductive coils are broken into a plurality of electromagnetic inductive segments at the crossings of the first and second electromagnetic inductive coils. Bridge wires disposed in the same layer as the second electrode layer electrically connect the electromagnetic inductive segments of the first electromagnetic inductive coils or the second electromagnetic inductive coils.

10 Claims, 9 Drawing Sheets

(51) Int. Cl.
*G06F 3/041* (2006.01)
*G06F 3/046* (2006.01)

(52) U.S. Cl.
CPC .............. *G06F 3/041* (2013.01); *G06F 3/046* (2013.01); *G06F 3/0412* (2013.01)

(58) Field of Classification Search
USPC ... 324/200, 207.11–207.19, 600, 654, 76.75, 324/76.11, 230, 256–258, 762.09–762.1, 324/546
See application file for complete search history.

(56) References Cited

U.S. PATENT DOCUMENTS

| | | | |
|---|---|---|---|
| 2011/0090171 A1 | 4/2011 | Chen et al. | |
| 2012/0129354 A1* | 5/2012 | Luong | H01L 21/6831 |
| | | | 438/714 |
| 2012/0169400 A1* | 7/2012 | Liu | G06F 3/0416 |
| | | | 327/517 |

\* cited by examiner

INDUCTIVE TOUCH-CONTROL DISPLAY SUBSTRATE, INDUCTIVE TOUCH-CONTROL SCREEN AND TOUCH-CONTROL DISPLAY DEVICE

CROSS-REFERENCES TO RELATED APPLICATIONS

This application claims the benefit of priority to Chinese Patent Application No. 201310747149.1, filed with the Chinese Patent Office on Dec. 30, 2013 and entitled "INDUCTIVE TOUCH-CONTROL DISPLAY SUBSTRATE, INDUCTIVE TOUCH-CONTROL SCREEN AND TOUCH-CONTROL DISPLAY DEVICE", the content of which is incorporated herein by reference in its entirety.

FIELD OF THE INVENTION

The present invention relates to a touch-control screen, and more particularly to an inductive touch-control display substrate, an inductive touch-control screen and a touch-control display device.

BACKGROUND OF THE INVENTION

Touch-control technologies have been widely applied to various electronic products in daily work and life in recent years. A user can enter information by directly touching a touch-control screen with a finger or an object, thereby eliminating the use of an input device (e.g., a keyboard, a mouse, a remote controller, etc.) and facilitating user operation.

Touch-control screen includes inductive touch-control screen, capacitive touch-control screen, resistive film touch-control screen, etc. In the inductive touch-control screen, a change in magnetic field of an electromagnetic inductive coil disposed on the touch-control screen is caused by a coil disposed on a specific electromagnetic pen to generate weak current and consequently calculate a touch coordinate.

The inductive touch-control screen in the prior art is typically configured with an attached inductive touch-control plate, where the inductive touch-control plate adopts a flexible circuit board as a carrier on which the electromagnetic inductive coil is disposed. In a practical application, the attached inductive touch-control plate is finally combined with a display panel into the inductive touch-control screen with a considerable thickness and complicated wiring, and the flexibility of the flexible circuit board of the inductive touch-control plate is redundant, thus resulting in a cost waste.

BRIEF SUMMARY OF THE INVENTION

Embodiments of the present invention provide an inductive touch-control display substrate, an inductive touch-control screen and a touch-control display device, so as to provide an in-cell inductive touch-control screen, thus reducing the thickness and the complexity of the inductive touch-control screen and saving the cost of manufacturing the same.

The object of the invention is attained by the following technical solution:

An embodiment of the present invention provides an in-cell inductive touch-control display substrate including: a first electrode layer; a second electrode layer insulated from the first electrode layer to form an electric field; a multitude of first electromagnetic inductive coils extending in the row direction and forming a multitude of first loops and a multitude of second electromagnetic inductive coils extending in the column direction and forming a multitude of second loops, the first and second electromagnetic inductive coils are disposed in the same layer as the first electrode layer; and the first electromagnetic inductive coils or the second electromagnetic inductive coils are broken into a plurality of electromagnetic inductive segments at the crossings of the first and second electromagnetic inductive coils; and a plurality of bridge wires disposed in the same layer as the second electrode layer is configured to electrically connect the electromagnetic inductive segments of the first electromagnetic inductive coils or the second electromagnetic inductive coils through via holes.

Embodiments of the invention have many advantages and benefits. For example, the first electrode layer and the second electrode layer of the array substrate are reused to prepare the electromagnetic inductive coils, to provide the in-cell inductive touch-control display substrate, which can reduce the thickness and the complexity of the inductive touch-control screen and save the cost of manufacturing the same when the in-cell inductive touch-control display substrate is applied to the inductive touch-control screen.

DETAILED DESCRIPTION OF THE INVENTION

Figure 1:
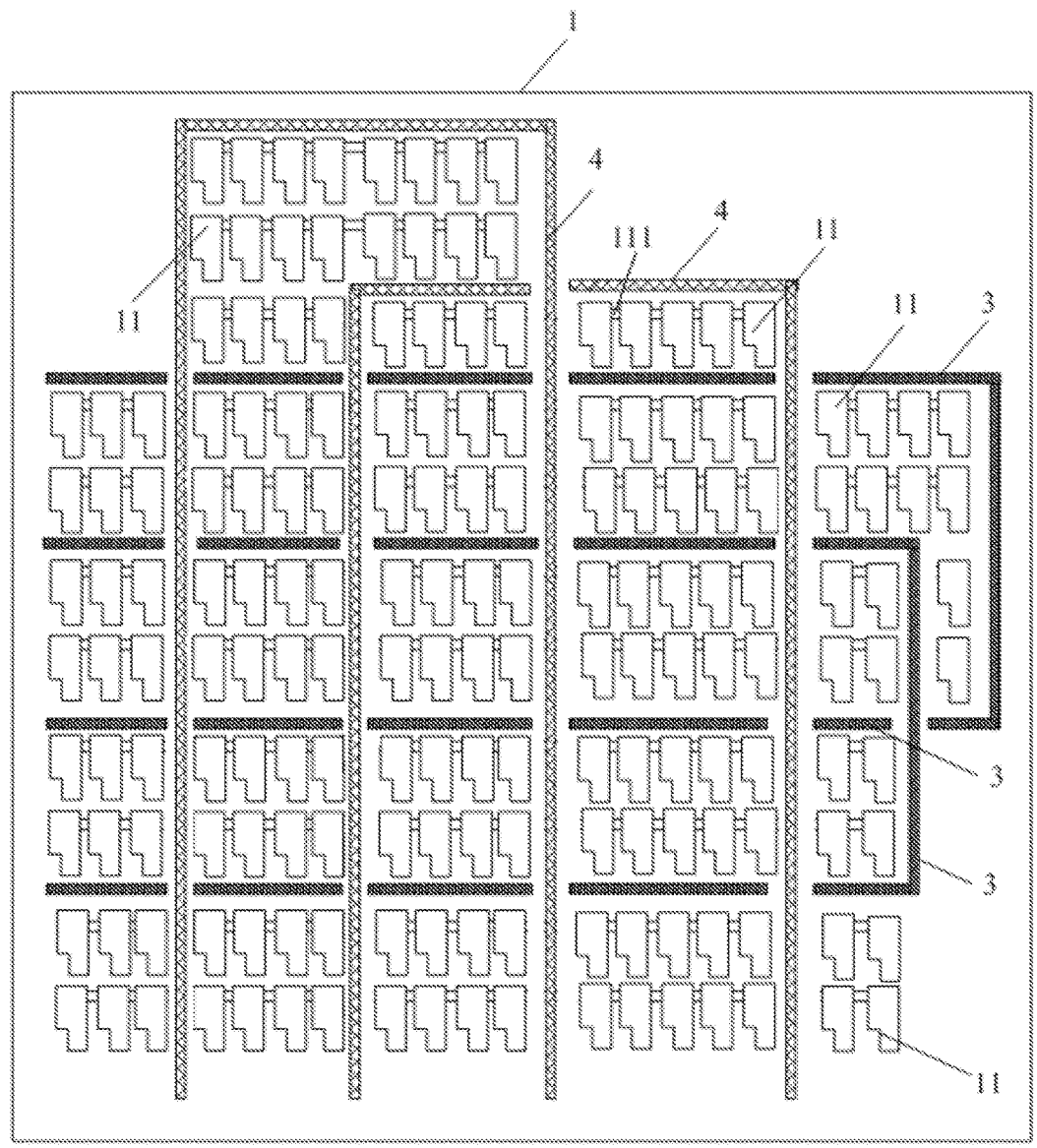
FIG. 1 is a schematic diagram of a portion of a first electrode layer (a common electrode layer) of an in-cell inductive touch-control display substrate provided by an embodiment of the present invention.

Embodiments of the present invention will be described below in detail with reference to the drawings. It shall be noted that identical or similar reference numerals will denote identical or similar elements or functionally identical or similar elements throughout the drawings. The embodiments described below with reference to the drawings are illustrative and intended to explain the present invention but not to be construed as limiting the invention.

Figure 2:
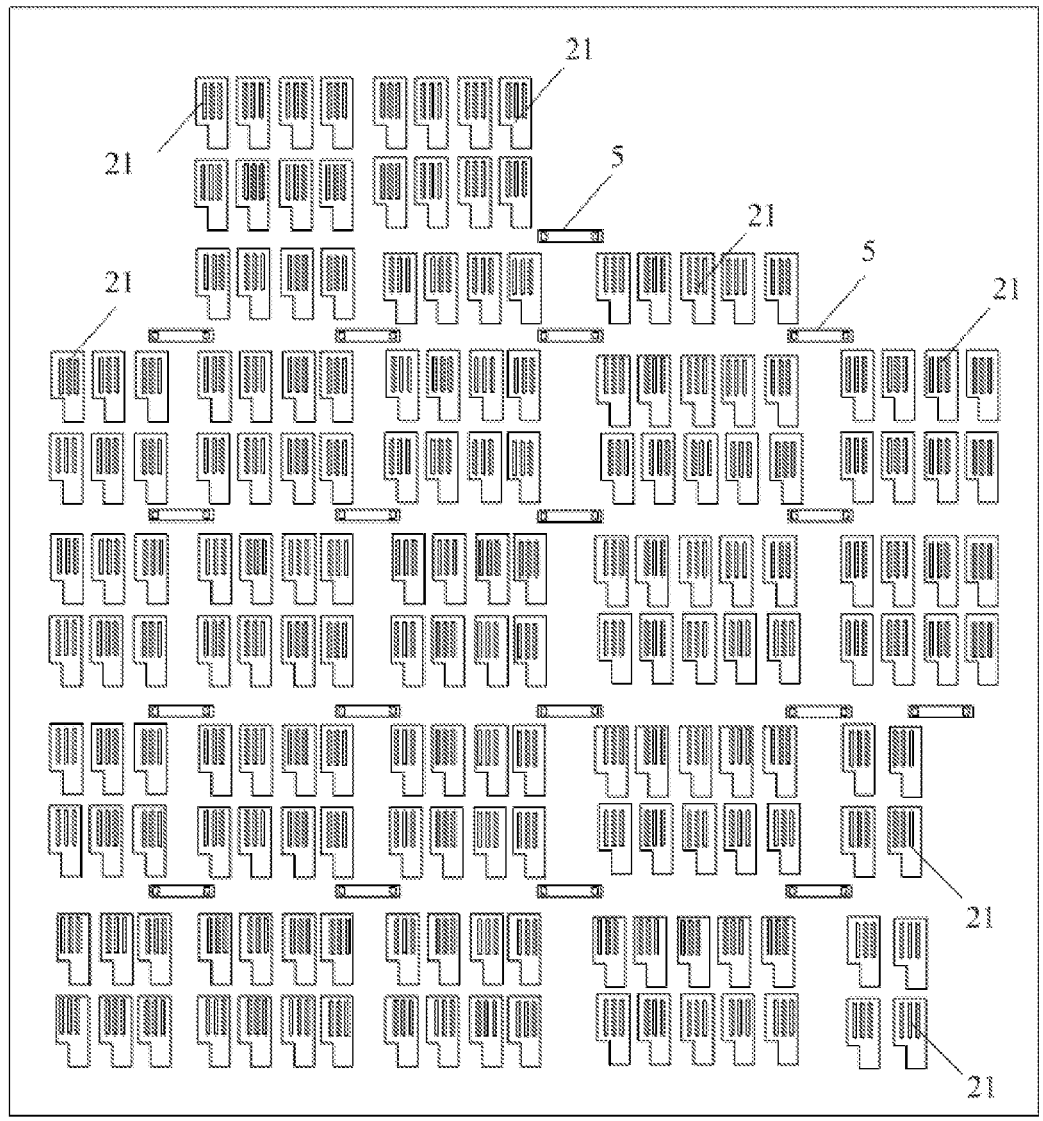
FIG. 2 is a schematic diagram of a portion of a second electrode layer (a pixel electrode layer) of an in-cell inductive touch-control display substrate provided by an embodiment of the present invention.

Referring to a schematic diagram of a portion of a first electrode layer 1 of an in-cell inductive touch-control display substrate illustrated in FIG. 1 and a schematic diagram of a portion of a second electrode layer 2 of the in-cell inductive touch-control display substrate illustrated in FIG. 2, the first electrode layer 1 may be a common electrode layer, and the second electrode layer 2 may be a pixel electrode layer; or the first electrode layer 1 may be a pixel electrode layer, and the second electrode layer 2 may be a common electrode layer. Particular examples are listed as follows:

For example, the first electrode layer 1 illustrated in FIG. 1 is a common electrode layer, and the second electrode layer 2 illustrated in FIG. 2 is a pixel electrode layer.

The first electrode layer 1 is a common electrode layer including a plurality of common electrode elements, and the second electrode layer 2 is a pixel electrode layer including a plurality of pixel electrode elements. In an embodiment, the common electrode layer is reused by both first electromagnetic inductive coils 3 and second electromagnetic inductive coils 4, the pixel electrode layer is reused by both bridge wires 5 and the pixel electrode elements, and electromagnetic inductive segments of the first electromagnetic inductive coils 3 or the second electromagnetic inductive coils 4 are electrically connected through via holes 6, to provide the in-cell inductive touch-control display substrate.

Referring to both FIG. 1 and FIG. 2, an embodiment of the present invention provides an in-cell inductive touch-control display substrate including:

A first electrode layer 1, which is a common electrode layer including a plurality of common electrode elements 11 configured to provide a common voltage; and a second electrode layer 2 insulated from the first electrode layer 1 to form an electric field, the second electrode layer 2 is a pixel electrode layer including a plurality of pixel electrode elements 21 configured to provide a pixel voltage, wherein an electric field is formed between the common electrode elements 11 and the pixel electrode elements 21 to control deflection of liquid crystal molecules in a liquid crystal layer for the purpose of displaying a picture.

Figure 3:
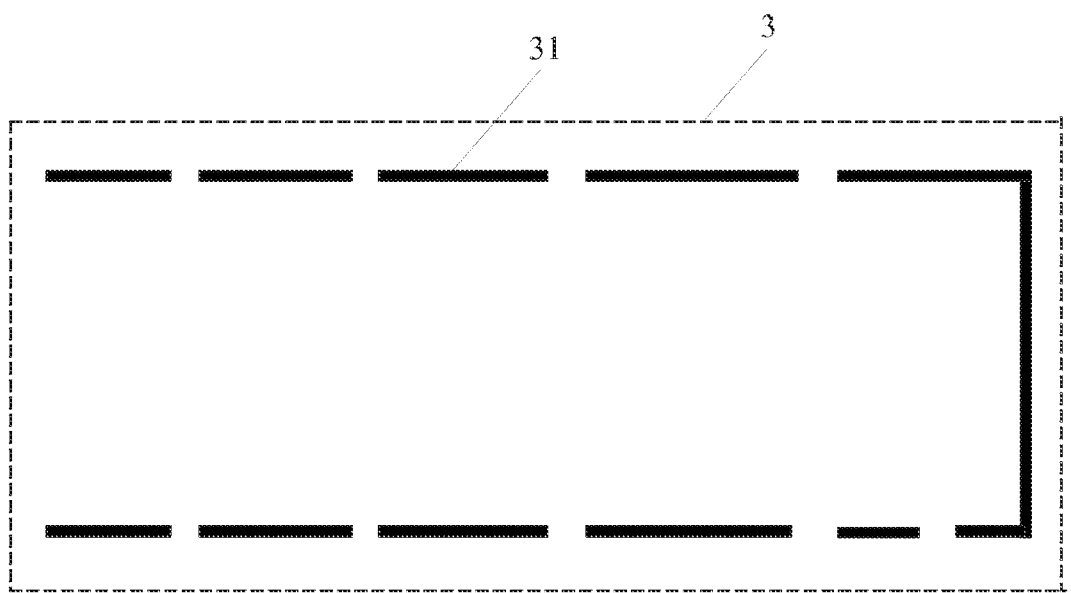
FIG. 3 is a schematic diagram of a portion of a first electromagnetic inductive coil provided by an embodiment of the present invention.
Figure 4:
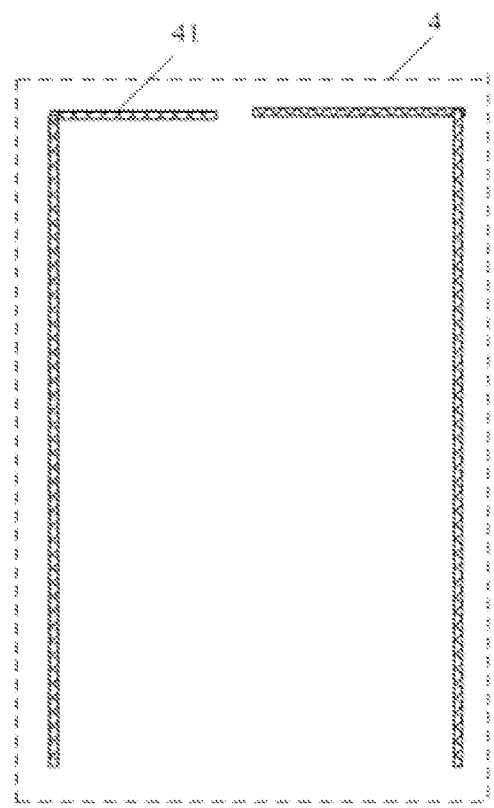
FIG. 4 is a schematic diagram of a portion of a second electromagnetic inductive coil provided by an embodiment of the present invention.

The first electromagnetic inductive coils 3 extending along the row direction and forming first loops and the second electromagnetic inductive coils 4 extending along the column direction and forming second loops are disposed in the same layer as the first electrode layer 1 (i.e., the common electrode layer); and reference is made to a schematic diagram of a portion of a first electromagnetic inductive coil 3 illustrated in FIG. 3 and a schematic diagram of a part of a second electromagnetic inductive coil 4 illustrated in FIG. 4. In this embodiment, the first electromagnetic inductive coils 3 and the second electromagnetic inductive coils 4 are disposed in the same layer and made of the same transparent conductive material as the common electrode elements 11.

As illustrated in FIG. 1, at least one row of common electrode elements 11 are included in a span of the first electromagnetic inductive coil 3 in the column direction; and at least one column of common electrode elements 11 are included in a span of the second electromagnetic inductive coil 4 in the row direction.

The plurality of common electrode elements 11 at the common electrode layer may be electrically connected together through wires 111 in the same layer to concurrently provide the common voltage to a plurality of pixel elements, and the common electrode elements 11 electrically connected together are separated at the locations through which the first electromagnetic inductive coil 3 or the second electromagnetic inductive coil 4 pass through, and the first electromagnetic inductive coils 3 or the second electromagnetic inductive coils 4 are broken into a plurality of first electromagnetic inductive segments 31 and second electromagnetic inductive segments 41 at the crossings of the first and second first electromagnetic inductive coils.

Figure 5:
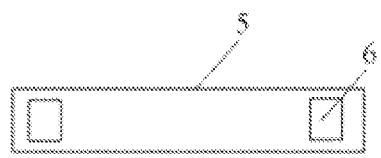
FIG. 5 is an enlarged schematic diagram of a bridge wire provided by an embodiment of the present invention.

A plurality of bridge wires 5 are disposed in the same layer as the second electrode layer 2 (i.e., the pixel electrode layer) as illustrated in FIG. 2, where the bridge wires 5 are disposed in the same layer and made of the same transparent conductive material as the pixel electrode elements 21. Since the pixel electrode elements 21 are separate structures, the bridge wires 5 may be disposed in gaps between adjacent rows or columns of pixel electrode elements without modifying a pattern of the pixel electrode elements. The first electromagnetic inductive segments 31 and the second electromagnetic inductive segments 41 are electrically connected by the bridge wires 5 through via holes 6 of the first electromagnetic inductive coils 3 or the second electromagnetic inductive coils 4 (see FIG. 5). Reference is made to FIG. 5 illustrating an enlarged schematic diagram of a bridge wire 5 on which via holes 6 are disposed, and it shall be noted that via holes corresponding to the via holes 6 illustrated in FIG. 5 are disposed in the locations where the first electromagnetic inductive coils 3 or the second electromagnetic inductive coils 4 are broken, and this is not illustrated herein again.

In an embodiment of the present invention, the first electrode layer and the second electrode layer of the array substrate are reused to prepare the electromagnetic inductive coils, to provide the in-cell inductive touch-control display substrate. When the in-cell inductive touch-control display substrate is applied to the inductive touch-control screen, the thickness and the complexity of an inductive touch-control screen can be reduced and savings of manufacturing costs of the same can be achieved.

Figure 6:
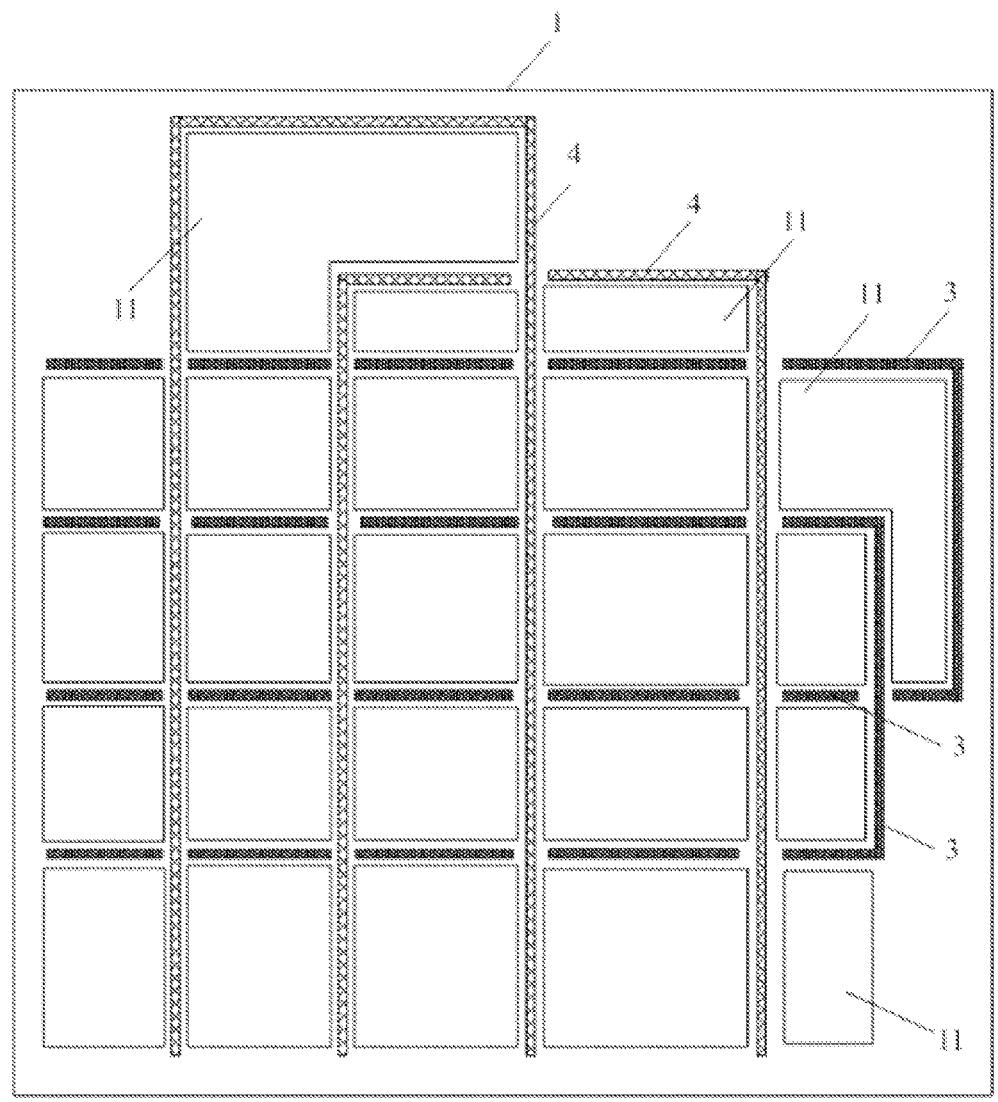
FIG. 6 is a schematic diagram of a portion of the first electrode layer provided by the embodiment of the present invention, as illustrated in FIG. 1, with common electrode elements being connected into a whole but spaced only at the locations where the first electromagnetic inductive coils and the second electromagnetic inductive coils are disposed.

Referring to FIG. 6, an embodiment of the present invention provides an in-cell inductive touch-control display substrate. The difference of the first electrode layer 1 of the in-cell inductive touch-control display substrate between FIG. 6 and FIG. 1 is that the common electrode elements 11 are connected as a whole and separated at the locations where the first electromagnetic inductive coils 3 and the second electromagnetic inductive coils 4 are disposed. The common electrode elements 11 are connected as a whole to reduce the amount of wires for driving the common electrode elements 11 and consequently provide a layout space as large as possible within the available region of space. In other words, the integrated unit of the common electrode elements 11 has a maximum layout space within the available space.

Figure 7:
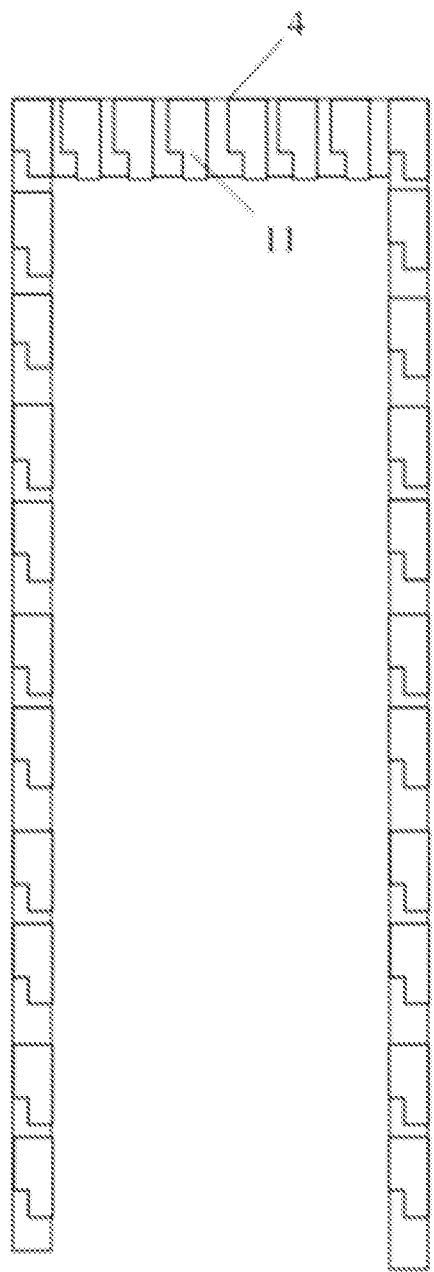
FIG. 7 is a schematic diagram of a second electromagnetic inductive coil consisted of a plurality of the common electrode elements provided by an embodiment of the present invention.

Furthermore, the first electromagnetic inductive coils 3 and/or the second electromagnetic inductive coils 4 may consist of a plurality of the common electrode elements, and the common electrode elements other than the first electromagnetic inductive coils 3 and the second electromagnetic inductive coils 4 are connected into a whole and spaced from the first electromagnetic inductive coils 3 and the second electromagnetic inductive coils 4. Referring to FIG. 7, a second electromagnetic inductive coil 4 is shown as having a plurality of the common electrode elements 11. Similarly, a first electromagnetic inductive coil 3 may include a plurality of the common electrode elements 11, and only be broken at the location where it intersects with the second electromagnetic inductive coil 4, and this is not illustrated herein.

When the first electrode layer 1 (i.e., the common electrode layer) is disposed above the second electrode layer 2 (i.e., the pixel electrode layer), that is, the first electrode layer 1 (i.e., the common electrode layer) is closer to the liquid crystal layer than the second electrode layer 2 (i.e., the pixel electrode layer), a common electrode element 11 includes a plurality of branch electrodes, which may be strip-shaped, fishbone-shaped or Z-shaped. When the first electrode layer 1 (i.e., the common electrode layer) is disposed below the second electrode layer 2 (i.e., the pixel electrode layer), that is, the second electrode layer 2 (i.e., the pixel electrode layer) is closer to the liquid crystal layer than the first electrode layer 1 (i.e., the common electrode layer), a pixel electrode element 12 includes a plurality of branch electrodes which may be strip-shaped, fishbone-shaped or Z-shaped. As shown in FIG. 2, a pixel electrode elements 21 includes four branches that are separated from one another by three strips. It is understood that four branches are arbitrary chosen for illustrative purposes only. It is understood that the branches can be any integer number and is non limiting.

Figure 8:
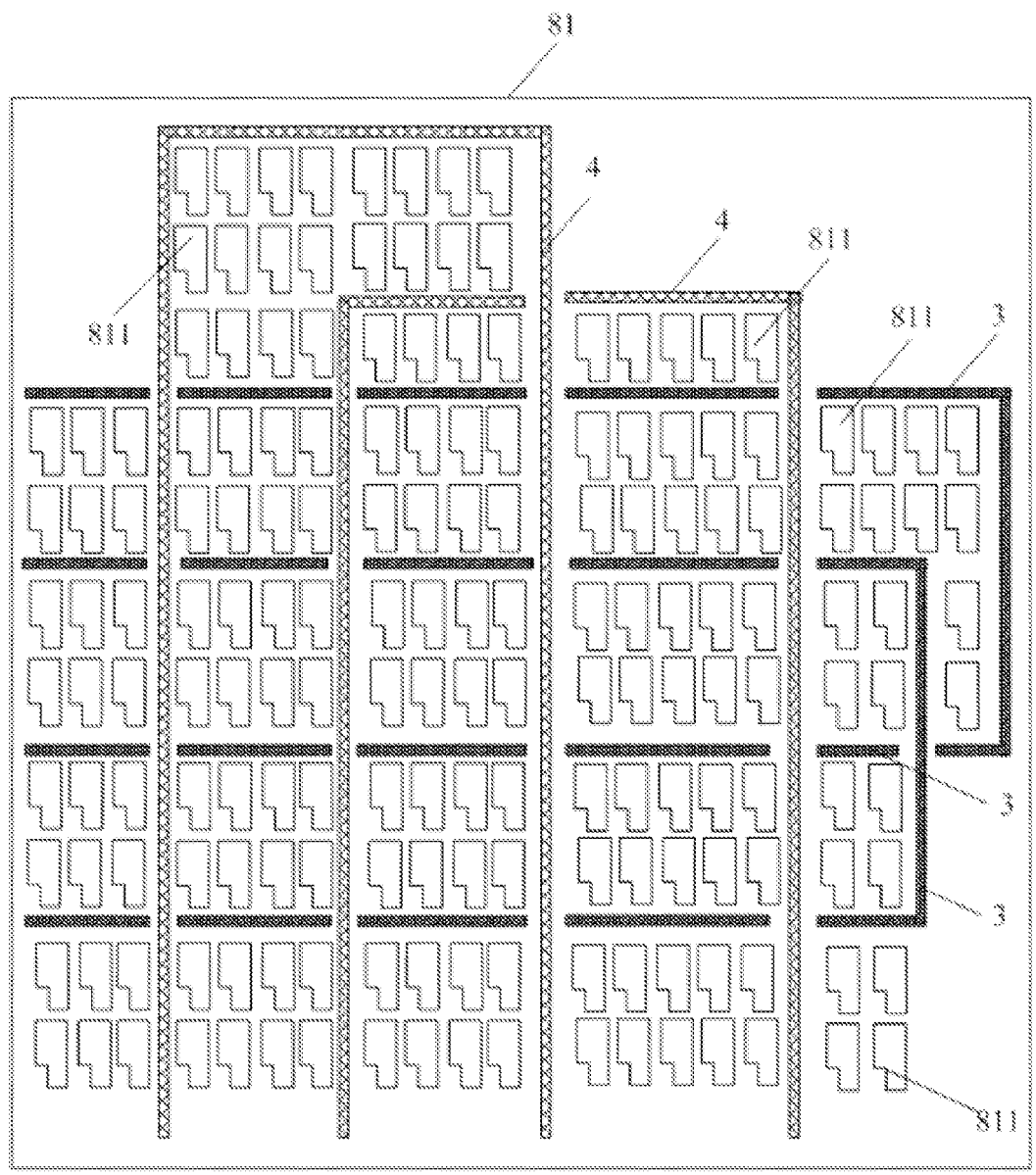
FIG. 8 is a schematic diagram of a portion of a first electrode layer (a pixel electrode layer) of another in-cell inductive touch-control display substrate provided by an embodiment of the present invention.
Figure 9:
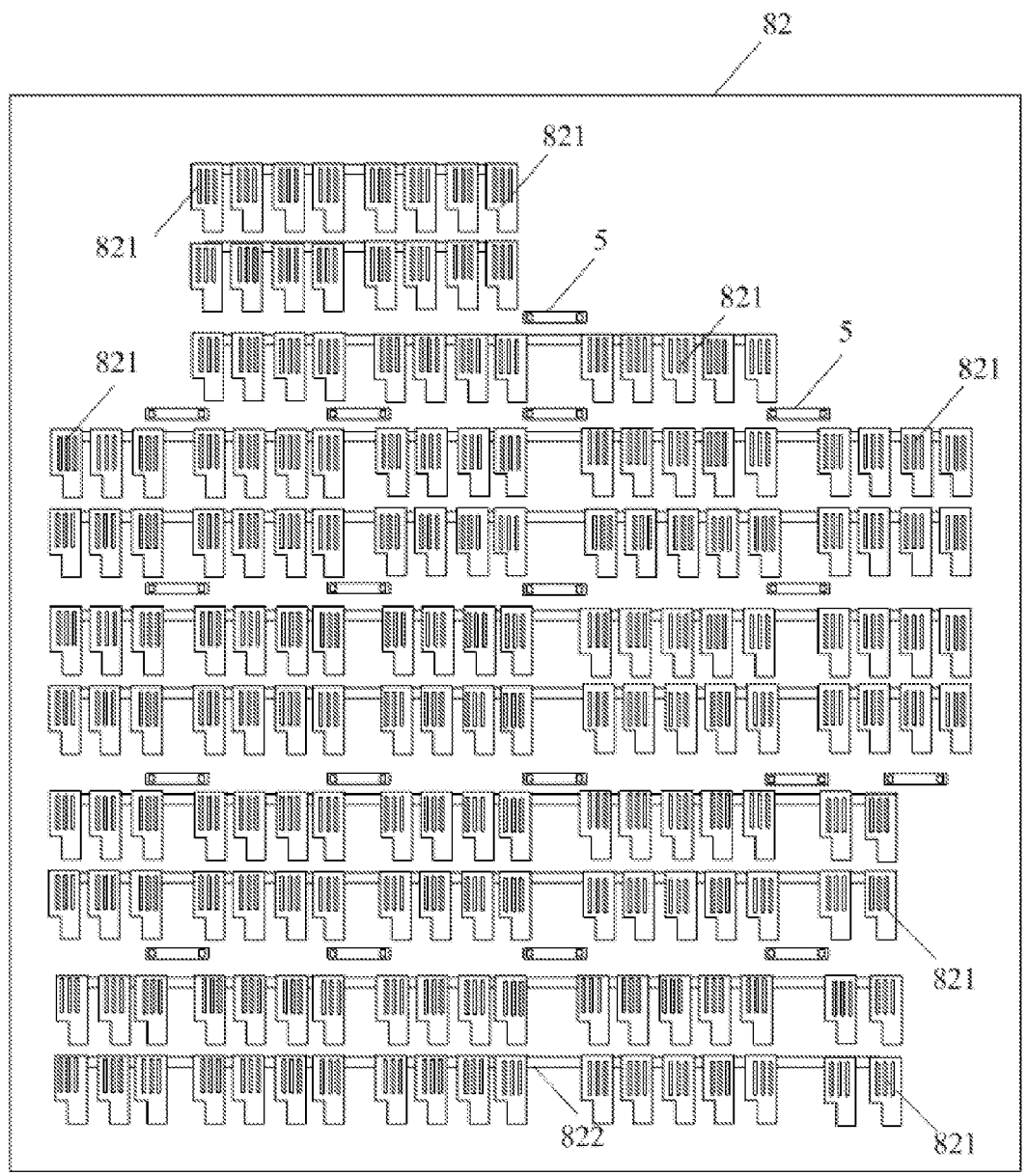
FIG. 9 is a schematic diagram of a portion of a second electrode layer (a common electrode layer) of another in-cell inductive touch-control display substrate provided by an embodiment of the present invention.

Referring to FIG. 8 and FIG. 9, an embodiment of the present invention provides another in-cell inductive touch-control display substrate including:

A first electrode layer 81, which is a pixel electrode layer including a plurality of pixel electrode elements 811 configured to provide a pixel voltage; and a second electrode layer 82 insulated from the first electrode layer 81 to form an electric field; where the second electrode layer 82 is a common electrode layer including a plurality of common electrode elements 821 configured to provide a common voltage. An electric field is formed between the common electrode elements 821 and the pixel electrode elements 811 to control deflection of liquid crystal molecules in a liquid crystal layer for the purpose of displaying a picture.

The first electromagnetic inductive coils 3 extending in the row direction and forming loops and the second electromagnetic inductive coils 4 extending in the column direction and forming loops are disposed in the same layer as the first electrode layer 81 (i.e., the pixel electrode layer); and reference is made to a schematic diagram of a portion of a first electromagnetic inductive coil 3 illustrated in FIG. 3 and a schematic diagram of a portion of a second electromagnetic inductive coil 4 illustrated in FIG. 4. In an embodiment, the first electromagnetic inductive coils 3 and the second electromagnetic inductive coils 4 are disposed in the same layer and made of the same transparent conductive material as the pixel electrode elements 811.

As illustrated in FIG. 8, at least one row of pixel electrode elements 811 are included in a span of the first electromagnetic inductive coil 3 in the column direction; and at least one column of pixel electrode elements 811 are included in a span of the second electromagnetic inductive coil 4 in the row direction.

The plurality of common electrode elements 821 at the common electrode layer may be electrically connected together through wires 822 in the same layer to concurrently provide the common voltage to the pixel elements, and the common electrode elements 821 electrically connected together are separated at the locations through which the first electromagnetic inductive coil 3 or the second electromagnetic inductive coil 4 run, and the first electromagnetic inductive coils 3 or the second electromagnetic inductive coils 4 are broken into a plurality of first electromagnetic inductive segments and second electromagnetic inductive segments at the crossings of the first and second electromagnetic inductive coils. A common electrode element may include a multitude of branches electrodes. As shown in FIG. 9, a common electrode element 821 includes 4 branches separated from each other by three strips. It is understood that four branches are arbitrary chosen for illustrative purposes. It is understood that the number of branches can be more or fewer than four.

A plurality of bridge wires 5 are disposed in the same layer as the second electrode layer 82 (i.e., the common electrode layer) as illustrated in FIG. 9, where the bridge wires 5 are disposed in the same layer and made of the same transparent conductive material as the common electrode elements 821. The spatially separated first electromagnetic inductive segments and the second electromagnetic inductive segments are electrically connected by the bridge wires 5 through via holes 6 of the first electromagnetic inductive coils 3 or the second electromagnetic inductive coils 4 (see FIG. 5). Reference is made to FIG. 5 illustrating an enlarged schematic diagram of a bridge wire 5 on which via holes 6 are disposed, and it shall be noted that via holes corresponding to the via holes 6 illustrated in FIG. 5 are disposed in the locations where the first electromagnetic inductive coils 3 or the second electromagnetic inductive coils 4 are broken, and this is not illustrated herein again.

In an embodiment of the present invention, the common electrode layer and the pixel electrode layer of the array substrate are reused to prepare the electromagnetic inductive coils, the first electromagnetic inductive coils 3 and the second electromagnetic inductive coils 4 are disposed in the pixel electrode layer, and the bridge wires 5 are disposed in the common electrode layer, to provide the in-cell inductive touch-control display substrate, which can reduce the thickness and the complexity of an inductive touch-control screen and save the cost of manufacturing the same when the in-cell inductive touch-control display substrate is applied to the inductive touch-control screen.

Figure 10:
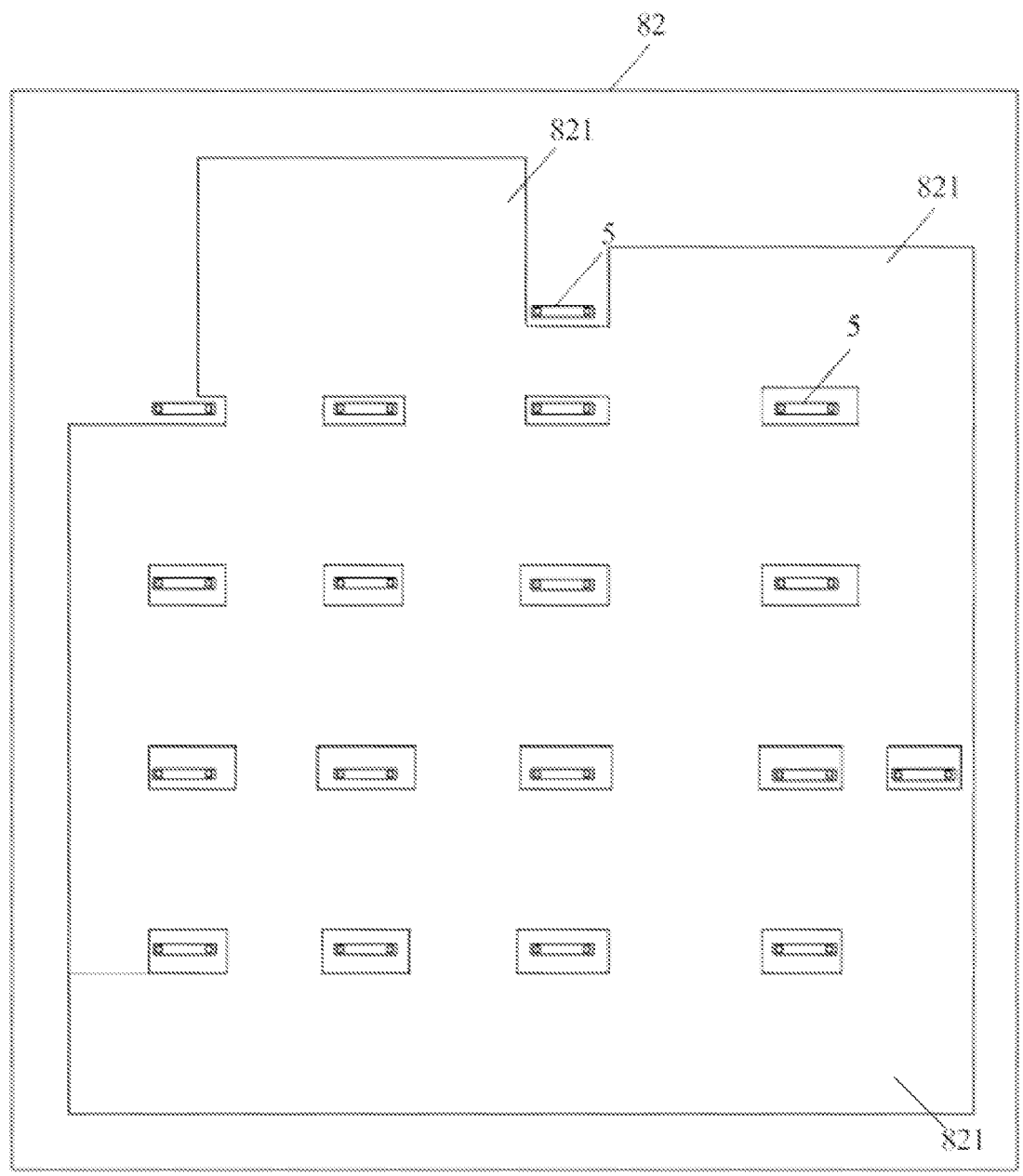
FIG. 10 is a schematic diagram of a portion of the second electrode layer provided by the embodiment of the present invention, as illustrated in FIG. 9, with common electrode elements being connected into a whole but spaced only at the locations where bridge wires are disposed.
Figure 11:
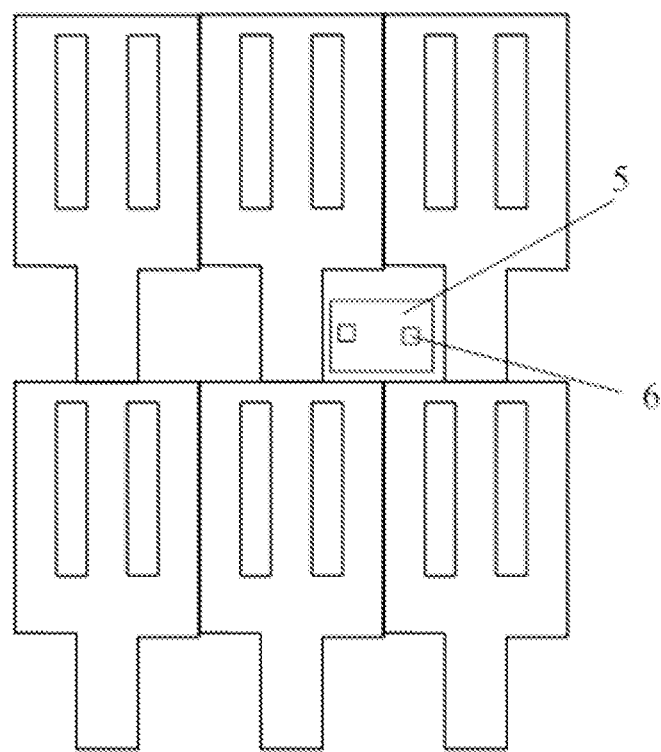
FIG. 11 is a schematic diagram of common electrode elements according to an embodiment of the invention, which are connected into a whole, where a hollow area in which a bridge wire is placed is disposed between adjacent common electrode elements.

Referring to FIG. 10, an embodiment of the present invention provides an in-cell inductive touch-control display substrate The difference of the second electrode layer 82 of the in-cell inductive touch-control display substrate between FIG. 8 and FIG. 9 is that the common electrode elements 821 are connected into a whole but spatially separated at the locations where the bridge wires 5 are disposed. Reference is made to FIG. 11 illustrating a schematic diagram of adjacent common electrode elements 821 between which a hollow area is disposed with a bridge wire 5 placed therein. Since the entire common electrode layer is hollow at the locations of thin film transistors of pixel elements, the bridge wires 5 may be disposed in the corresponding hollow locations without significantly modifying the pattern of the common electrode layer. The via holes 6 are disposed on the bridge wires 5 at the locations corresponding to the distal ends of the first electromagnetic inductive segments and the second electromagnetic inductive segments, and the respective first electromagnetic inductive segments and second electromagnetic inductive segments are electrically connected via the via holes 6. The common electrode elements 821 are connected into a whole, to reduce the amount of wires for driving the common electrode elements 821 and consequently provide a maximum layout space.

In an embodiment, when the first electrode layer 81 (i.e., the pixel electrode layer) is disposed above the second electrode layer 82 (i.e., the common electrode layer), that is, the first electrode layer 81 (i.e., the pixel electrode layer) is closer to the liquid crystal layer than the second electrode layer 82 (i.e., the common electrode layer), a pixel electrode element 811 includes a plurality of branch electrodes which may be strip-shaped, fishbone-shaped or Z-shaped; and when the first electrode layer 81 (i.e., the pixel electrode layer) is disposed below the second electrode layer 82 (i.e., the common electrode layer), that is, the second electrode layer 82 (i.e., the common electrode layer) is closer to the liquid crystal layer than the first electrode layer 81 (i.e., the pixel electrode layer), a common electrode element 821 includes a plurality of branch electrodes which may be strip-shaped, fishbone-shaped or Z-shaped.

It shall be noted that the foregoing embodiments are merely preferred embodiments of the present invention, but the present invention will not be limited thereto.

In summary, when the common electrode layer is disposed below the pixel electrode layer, the pixel electrode elements are disposed separately and each includes at least one branch electrode. In an embodiment, the pixel electrode elements are formed in a hollow structure or a multi-finger structure and each includes at least one branch electrode, to reduce parasitic capacitances between the pixel electrode elements and the common electrode elements; and when the pixel electrode layer is disposed below the common electrode layer, the common electrode element includes at least one branch electrode. In an embodiment, the common electrode elements are formed in a hollow structure or a multi-finger structure and each includes at least one branch electrode, to reduce parasitic capacitances between the common electrode elements and the pixel electrode elements.

Embodiments of the present invention provide many advantages and benefits. The first electrode layer and the second electrode layer of the array substrate are reused to prepare the electromagnetic inductive coils, to provide the in-cell inductive touch-control display substrate, which can reduce the thickness and the complexity of an inductive touch-control screen and save the cost of manufacturing the same when the in-cell inductive touch-control display substrate is applied to the inductive touch-control screen. Embodiments of the present invention also provide an inductive touch-control screen including the inductive touch-control display substrate described above and a cover plate attached on the inductive touch-control display substrate for the purpose of protection. According to an embodiment, an inductive touch-control screen is configured with the in-cell inductive touch-control display substrate, in which the first electrode layer and the second electrode layer of the array substrate are reused to prepare the electromagnetic inductive coils, thus reducing the thickness and the complexity of the inductive touch-control screen and saving the cost of manufacturing the same. A touch-control display device including the inductive touch-control screen described above and a display screen configured to display a picture are also provided.

Evidently, those skilled in the art can make various modifications and variations to the present invention without departing from the spirit and scope of the invention. Thus the present invention is also intended to encompass these modifications and variations thereto so long as the modifications and variations come into the scope of the claims appended to the present invention and their equivalents.

What is claimed is:

1. An in-cell inductive touch-control display substrate, comprising:

a first electrode layer;

a second electrode layer insulated from the first electrode layer to form an electric field;

a plurality of first electromagnetic inductive coils extending along a row direction and forming a plurality of first loops and a plurality of second electromagnetic inductive coils extending along a column direction and forming a plurality of second loops, the first and second electromagnetic inductive coils being disposed in a same layer as the first electrode layer; wherein either the first electromagnetic inductive coils or the second electromagnetic inductive coils are broken into a plurality of electromagnetic inductive segments at the crossings of the first and second electromagnetic inductive coils; and a plurality of bridge wires disposed in a same layer as the second electrode layer and configured to electrically connect the electromagnetic inductive segments of the first electromagnetic inductive coils or the second electromagnetic inductive coils through a plurality of via holes;

wherein the first electrode layer is a common electrode layer including a plurality of common electrode elements, and the second electrode layer is a pixel electrode layer including a plurality of pixel electrode elements; or the first electrode layer is a pixel electrode layer including a plurality of pixel electrode elements, and the second electrode layer is a common electrode layer including a plurality of common electrode elements;

wherein a first electromagnetic inductive coil comprises at least one row of the common electrode elements or at least one row of the pixel electrode elements in a span along the column direction; and a second electromagnetic inductive coil comprises at least one column of the common electrode elements or at least one column of the pixel electrode elements in a span along the row direction.

2. The in-cell inductive touch-control display substrate according to claim 1, wherein when the first electrode layer is a common electrode layer including a plurality of common electrode elements, and the second electrode layer is a pixel electrode layer including a plurality of pixel electrode elements, the first electromagnetic inductive coils and the second electromagnetic inductive coils are made of a same transparent conductive material as the common electrode layer, and the bridge wires are made of a same transparent conductive material as the pixel electrode layer.

3. The in-cell inductive touch-control display substrate according to claim 2, wherein the common electrode elements are connected as a whole and spatially separated at locations where the first electromagnetic inductive coils and the second electromagnetic inductive coils are disposed.

4. The in-cell inductive touch-control display substrate according to claim 1, wherein when the first electrode layer is a common electrode layer including a plurality of common electrode elements, and the second electrode layer is a pixel electrode layer including a plurality of pixel electrode elements, the first electromagnetic inductive coils and/or the second electromagnetic inductive coils comprise a first plurality of connected common electrode elements, and a second plurality of common electrode elements other than the first plurality of common electrode elements are connected as a whole and spatially separated from the first electromagnetic inductive coils and the second electromagnetic inductive coils.

5. The in-cell inductive touch-control display substrate according to claim 1, wherein when the first electrode layer is a pixel electrode layer including a plurality of pixel electrode elements, and the second electrode layer is a common electrode layer including a plurality of common electrode elements, the first electromagnetic inductive coils and the second electromagnetic inductive coils are made of a same transparent conductive material as the pixel electrode layer, and the bridge wires are made of a same transparent conductive material as the common electrode layer.

6. The in-cell inductive touch-control display substrate according to claim 1, wherein when the first electrode layer is a pixel electrode layer including a plurality of pixel electrode elements, and the second electrode layer is a common electrode layer including a plurality of common electrode elements, the common electrode elements are connected as a whole, and a hollow area configured to receive a bridge wire is disposed between adjacent common electrode elements.

7. The in-cell inductive touch-control display substrate according to claim 1, wherein the common electrode layer is disposed below the pixel electrode layer, the pixel electrode elements are spatially separated, and each of the pixel electrode elements includes at least one branch electrode.

8. The in-cell inductive touch-control display substrate according to claim 1, wherein the pixel electrode layer is disposed below the common electrode layer and the common electrode elements each include at least one branch electrode.

9. An inductive touch-control screen comprising an in-cell inductive touch-control display substrate, wherein the in-cell inductive touch-control display substrate comprises:
a first electrode layer;
a second electrode layer insulated from the first electrode layer to form an electric field;
a plurality of first electromagnetic inductive coils extending along a row direction and forming a plurality of first loops and a plurality of second electromagnetic inductive coils extending along a column direction and forming a plurality of second loops, the first and second electromagnetic inductive coils being disposed in the same layer as the first electrode layer; wherein the first electromagnetic inductive coils or the second electromagnetic inductive coils are broken into a plurality of electromagnetic inductive segments at the crossings of the first and second electromagnetic inductive coils; and
a plurality of bridge wires disposed in the same layer as the second electrode layer and configured to electrically connect the electromagnetic inductive segments of the first electromagnetic inductive coils or the second electromagnetic inductive coils through a plurality of via holes;
wherein the first electrode layer is a common electrode layer including a plurality of common electrode elements, and the second electrode layer is a pixel electrode layer including a plurality of pixel electrode elements; or
the first electrode layer is a pixel electrode layer including a plurality of pixel electrode elements, and the second electrode layer is a common electrode layer including a plurality of common electrode elements;
wherein a first electromagnetic inductive coil comprises at least one row of the common electrode elements or at least one row of the pixel electrode elements in a span along the column direction; and a second electromagnetic inductive coil comprises at least one column of the common electrode elements or at least one column of the pixel electrode elements in a span along the row direction.

10. A touch-control display device comprising an inductive touch-control screen, the inductive touch-control screen comprising an in-cell inductive touch-control display substrate, wherein the in-cell inductive touch-control display substrate comprises:
a first electrode layer;
a second electrode layer insulated from the first electrode layer to form an electric field;
a plurality of first electromagnetic inductive coils extending along a row direction and forming a plurality of first loops and a plurality of second electromagnetic inductive coils extending along a column direction and forming a plurality of second loops, the first and second electromagnetic inductive coils being disposed in a same layer as the first electrode layer; wherein the first electromagnetic inductive coils or the second electromagnetic inductive coils are broken into a plurality of electromagnetic inductive segments at the crossings of the first and second electromagnetic inductive coils; and
a plurality of bridge wires disposed in the same layer as the second electrode layer and configured to electrically connect the electromagnetic inductive segments of the first electromagnetic inductive coils or the second electromagnetic inductive coils through a plurality of via holes;
wherein the first electrode layer is a common electrode layer including a plurality of common electrode elements, and the second electrode layer is a pixel electrode layer including a plurality of pixel electrode elements; or
the first electrode layer is a pixel electrode layer including a plurality of pixel electrode elements, and the second electrode layer is a common electrode layer including a plurality of common electrode elements;
wherein a first electromagnetic inductive coil comprises at least one row of the common electrode elements or at least one row of the pixel electrode elements in a span along the column direction; and a second electromagnetic inductive coil comprises at least one column of the common electrode elements or at least one column of the pixel electrode elements in a span along the row direction.

* * * * *